US006353852B1

(12) United States Patent
Nestoriak, III et al.

(10) Patent No.: US 6,353,852 B1
(45) Date of Patent: Mar. 5, 2002

(54) ENHANCED TELEPHONE SERVICE SYSTEM WITH SECURE SYSTEM AND METHOD FOR E-MAIL ADDRESS REGISTRATION

(75) Inventors: John Nestoriak, III, Bethesda, MD (US); Eric William Burger, McLean, VA (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 09/238,108

(22) Filed: Jan. 27, 1999

(51) Int. Cl.$^7$ .................. G06F 15/16; H04M 11/00; H04M 1/64
(52) U.S. Cl. ............... 709/206; 709/245; 379/93.24; 379/88.17
(58) Field of Search .................. 709/206, 245; 379/88.17, 93.01–93.03, 93.24

(56) References Cited

U.S. PATENT DOCUMENTS

| | | | |
|---|---|---|---|
| 4,994,926 A | | 2/1991 | Gordon et al. ............ 358/400 |
| 5,193,110 A | | 3/1993 | Jones et al. .............. 379/94 |
| 5,727,163 A | * | 3/1998 | Bezos ................... 709/227 |
| 5,864,684 A | * | 1/1999 | Nielsen ................. 709/206 |
| 6,167,435 A | * | 12/2000 | Druckenmiller et al. .... 709/206 |
| 6,208,998 B1 | * | 3/2001 | Marcus ................ 707/104.1 |
| 6,240,391 B1 | * | 5/2001 | Ball et al. .............. 704/270 |

OTHER PUBLICATIONS

Buckman, J., A History of List Servers, Lyris Technologies, Inc., http://www.lyris.com/about/company/whitepaters/list-server_history.html, pp. 1–8, Jan. 2000.*
Buckman, J., Comparing List Servers, Lyris Technologies, Inc., pp. 1–23, Feb. 1999.*
General User's Guide for LISTSERV(R), version 1.8c, L–Soft Int'l., Inc., ref. No. 9611–UD–06, pp. 1–36, Dec. 1996.*
Mailing List Management Software FAQ, http://www.greatcircle.com/lists/list–managers/software–faq, pp. 1–24, Jan. 1995.*
L–Soft International. (Jul. 1996). LISTSERV for Window 95. Database [Online] 1–2. Available Web Site: www.softseek.com–listserv Accessed on: Oct. 30, 1998.
L–Soft International. (Aug. 1995). LISTSERV® for Windows 95. Database [Online] 1–4. Available Web Site: www.lsoft.com/win95–info.html Accessed on: Oct. 30, 1998.

* cited by examiner

Primary Examiner—Zarni Maung
Assistant Examiner—Andrew Caldwell
(74) Attorney, Agent, or Firm—Pennie & Edmonds LLP

(57) ABSTRACT

In a system for registering E-mail addresses for subscribers of the system, a telephone call manager, upon request, provides a subscriber with a unique identifier and stores a copy of the unique identifier. An E-mail manager receives and processes an E-mail message sent to a first E-mail address, the received E-mail message including a request to register a second E-mail address, the received E-mail message including the unique identifier. The E-mail manager, upon receipt of the E-mail message, compares the unique identifier with the copy of the unique identifier stored by the telephone call manager, and registers the second E-mail address only if the unique identifier and the copy of the unique identifier correspond. In a second embodiment, an E-mail message requesting registration of the second E-mail address is first sent to the E-mail manager. When the subscriber places a telephone call to the system, and enters a password that is verified by the telephone call manager, the telephone call manager notifies the subscriber of the pending E-mail address registration request and registers the specified second E-mail address only if the subscriber so authorizes.

16 Claims, 7 Drawing Sheets

Enhanced Telephone Service System
100

102

Service Provider /
Enhanced Service
Platform

104 — Telephony Network

Data Network — 108

106

Telephony Device

110

Electronic Mail Device

FIG. 1

Database Record
450

| 452 | 454 | 456 | 458 | |
|---|---|---|---|---|
| Telephone Number | E-mail Address | Unique ID | Timestamp | ... |

FIG. 5

ENHANCED TELEPHONE SERVICE SYSTEM WITH SECURE SYSTEM AND METHOD FOR E-MAIL ADDRESS REGISTRATION

The present invention relates generally to an E-mail address registration system and method and more particularly to a secure E-mail registration method for registering an E-mail address with an enhanced telephone service provider.

BACKGROUND OF THE INVENTION

Registration of E-mail addresses is well known among service providers. Service providers routinely require subscribers to specify a personal E-mail address. This is typically completed by having the subscriber do one of the following: send an E-mail message containing personal E-mail address routing information to a specified E-mail address; use a web browser, such as Netscape Navigator, to log onto the service provider's web site on the world-wide-web to register a personal E-mail address; spell out an E-mail address on a telephone keypad; or speak their E-mail address to a live operator.

A list server is an example of a service provider that often requires subscribers to register a personal E-mail address in order to receive mail deliveries. A subscriber is generally required to send an E-mail message to a specified E-mail address, the E-mail message requesting subscription to the list server's services. After receiving the E-mail message, the list-server registers the corresponding E-mail address by storing the network routing information contained in the E-mail message. For more information on list-servers, see *List Owner's Manual for LISTSERV, ver. 1.8*, L-Soft International, Inc., 1997, which is hereby incorporated by reference for purposes of background information.

The problems associated with known E-mail registration techniques are numerous. For example, notifying a subscriber that the registration attempt was, or was not, successful is often difficult; entering an E-mail address via a telephone keypad is not a very accurate method of entry; and, verifying that a subscribed service is being directed to a legitimate entity is difficult.

After processing an E-mail message registration request from a subscriber, notifying the subscriber that the registration attempt was, or was not, successful can be difficult. A common method of registration verification is for a service provider to send an E-mail message to a subscriber's E-mail address confirming the registration. The network routing information contained in the subscribing E-mail message is typically used for this purpose. However, lack of a corresponding non-delivery notification does not positively indicate successful delivery of the confirming E-mail message. To further complicate matters, if the E-mail address is invalid for any reason, a service provider typically has no way of notifying the subscriber to try to register again.

Using a telephone keypad to enter an E-mail address is not a very accurate method of entry. E-mail addresses are often quite long and typically include non-alphanumeric punctuation, such as the "at" sign (@) or the underscore (_); neither punctuation is represented on a telephone keypad. Therefore, the likelihood of error for typing in an E-mail address on a telephone key pad is quite high. Similarly, speaking an E-mail address to a live telephone operator is prone to human recording error.

It is important to ensure that a subscribed service is being directed to a legitimate entity and similarly that the subscriber's E-mail registration is not being redirected. This is especially pertinent when the services being provided are proprietary or expensive.

What is needed is an E-mail registration system and method for registering an E-mail address with a service provider that solves E-mail address specification, verification, and notification issues commonly encountered by service provider platforms. A system is needed that provides a method for accurately entering an E-mail address, provides a method to verify that the subscribed service is being directed to a legitimate entity, and insures that the status of a successful or unsuccessful E-mail registration attempt is conveyed to the subscriber.

BRIEF DESCRIPTION OF THE DRAWINGS

Additional objects and features of the invention will be more readily apparent from the following detailed description and appended claims when taken in conjunction with the drawings, in which:

FIG. 1 is a block diagram of an embodiment of the enhanced telephone service system of the present invention;

FIG. 5 is a block diagram of an embodiment of a database record, for storing E-mail registration information.

SUMMARY OF THE INVENTION

Figure 2:
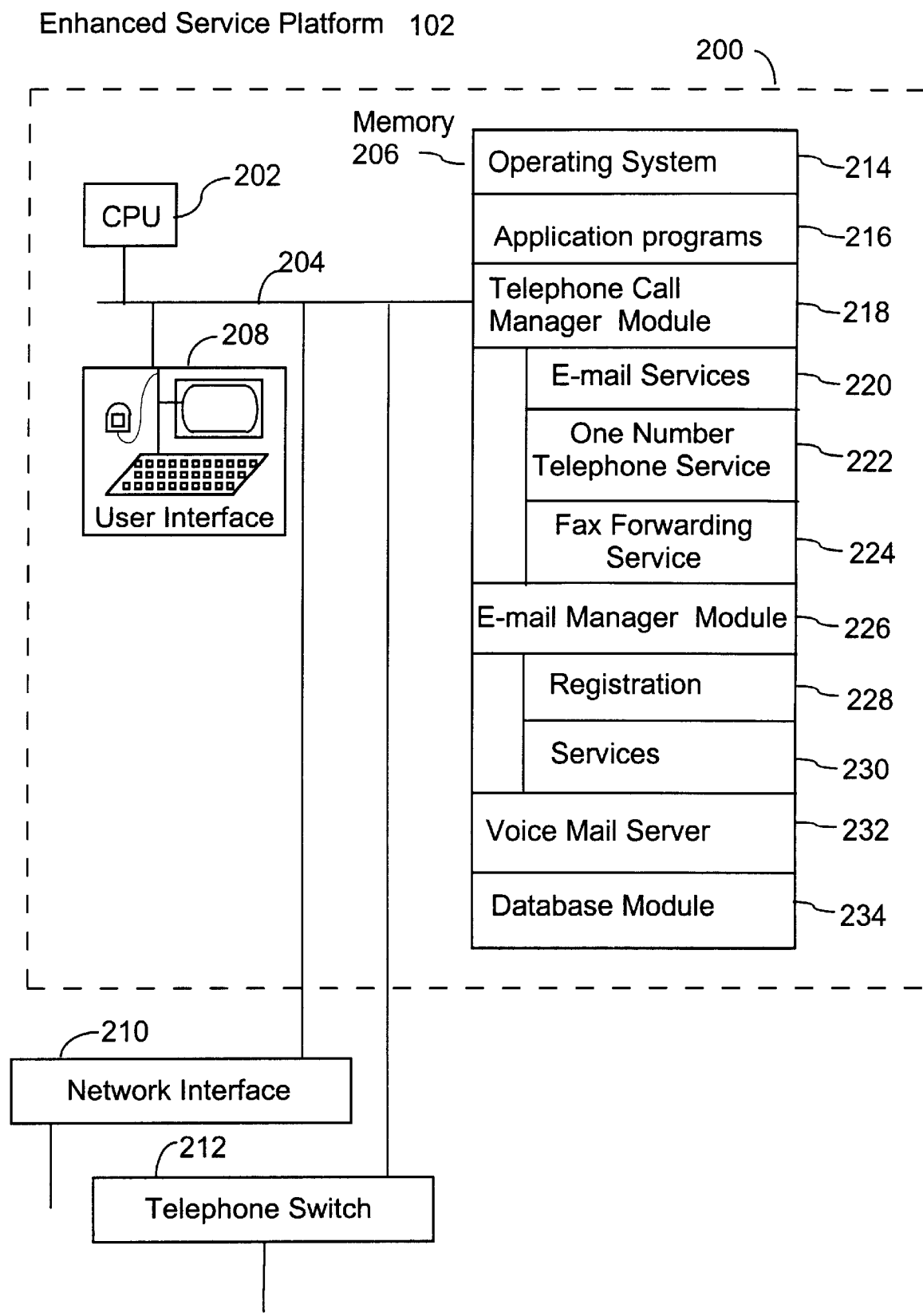
FIG. 2 is a block diagram of an embodiment of the enhanced service platform of the present invention, for registering an E-mail address with a service provider.

The system and method of the present invention provide a telephone call manager and an E-mail manager for registering a subscriber's E-mail address. The telephone call manager is configured to receive telephone calls. Upon receiving an E-mail registration request from a subscriber, the Telephone Call Manager supplies the subscriber with a unique identifier, and stores a copy of the unique identifier.

The E-mail manager is configured to receive E-mail. When an E-mail message requesting E-mail address registration is received, the message will specify the E-mail address to register, as well as the unique identifier. The E-mail manager compares the unique identifier with the copy of the unique identifier stored by the telephone call manager. Only if they match does the E-mail manager register the E-mail address.

In a preferred embodiment, a subscriber first telephones the service platform, providing it with information used to verify a privileged status of the subscriber to use the platform's services, and also a request to register an E-mail address. The service platform supplies a unique identifier to the subscriber, and stores the unique identifier and subscriber's telephone number for later retrieval. The subscriber then sends an E-mail message to the service platform requesting to register and specifying a personal E-mail address. The E-mail message includes the unique identifier. Upon receiving the subscriber's E-mail message, the service platform uses the unique identifier to verify the E-mail registration request. If the registration request is verified, the service platform registers the E-mail address and sends an E-mail message including a successful registration notification to the registered E-mail address. If that E-mail message is not deliverable, the provider contacts the subscriber via the stored telephone number to deliver a voice message indicating that the registered E-mail address may be invalid or inoperative. In this manner, the service platform solves personal E-mail address specification, verification, and notification issues commonly encountered in the E-mail registration process.

DESCRIPTION OF THE PREFERRED EMBODIMENTS

The Enhanced Telephone Service System

Referring to FIG. 1, where there is shown an embodiment of the enhanced telephone service system 100, including:

- a Service Provider/Enhanced Service Platform 102, for providing a plurality of services to a subscriber; the services including, for example: telephone answering, fax, paging, emergency notification, voice, Voice over Data (e.g., VoIP) and E-mail services;
- a Telephony Network 104, including wireless and public switched telephone networks, for providing access to the Enhanced Service Platform 102;
- a Telephony Device 106, such as a telephone, for accessing the Enhanced Service Platform 102 via the Telephony Network 104;
- a Data Network 108, such as a computer network or the World-Wide Web on the Internet, for providing access to the Enhanced Service Platform 102; and
- an Electronic Mail Device 110, such as a client computer executing an E-mail computer program, for providing E-mail access to the Enhanced Service Platform 102 via the Data Network 108.

The Enhanced Service Platform

Referring to FIG. 2, there is shown an embodiment of the Enhanced Service Platform 102 of the present invention. The Enhanced Service Platform 102 may be implemented using a programmed general-purpose computer system 200. The Enhanced Service Platform 102 may include:

- one or more data processing units (CPUs) 202;
- memory 206, which will typically include both high speed random access memory as well as non-volatile memory (such as one or more magnetic disk drives);
- a user interface 208, for interfacing with the operating system and application programs;
- a network or other communication interface 210, for communicating with other computers and other devices; a telephone switch 212, for receiving and forwarding telephone calls;
- one or more communication busses 204, for interconnecting the CPU(s) 202, memory 206, user interface 208, network interface 210, and telephone switch 212.

The computer system's memory 206 stores procedures and data, typically including:

- an operating system 214 for providing basic system services;
- application programs 216, such as user level programs for viewing and manipulating images;
- a telephone call manager module 218, for providing telephony services to a subscriber;
- an E-mail manager module 226, for providing E-mail services to a subscriber;
- a voice mail server 232, for receiving and forwarding voice messages; and
- a database module 234, for storing E-mail registration and subscriber information.

The Telephone Manager Module 218 may include:

- an E-mail services module 220, for setting up an E-mail services account (to be managed by the E-mail manager 226) for a subscriber;
- a one number telephone service 222, for providing a plurality of one-number telephony services to a subscriber; and
- a fax forwarding service 224, for forwarding faxes to a subscriber.

The E-mail Manager Module 226 may include:

- a registration module 228, for registering a subscriber's E-mail address; and
- an service module 230, for providing a subscriber with E-mail services, for example receiving and forwarding a subscriber's E-mail.

Telephone Call Manager Module

Figure 3:
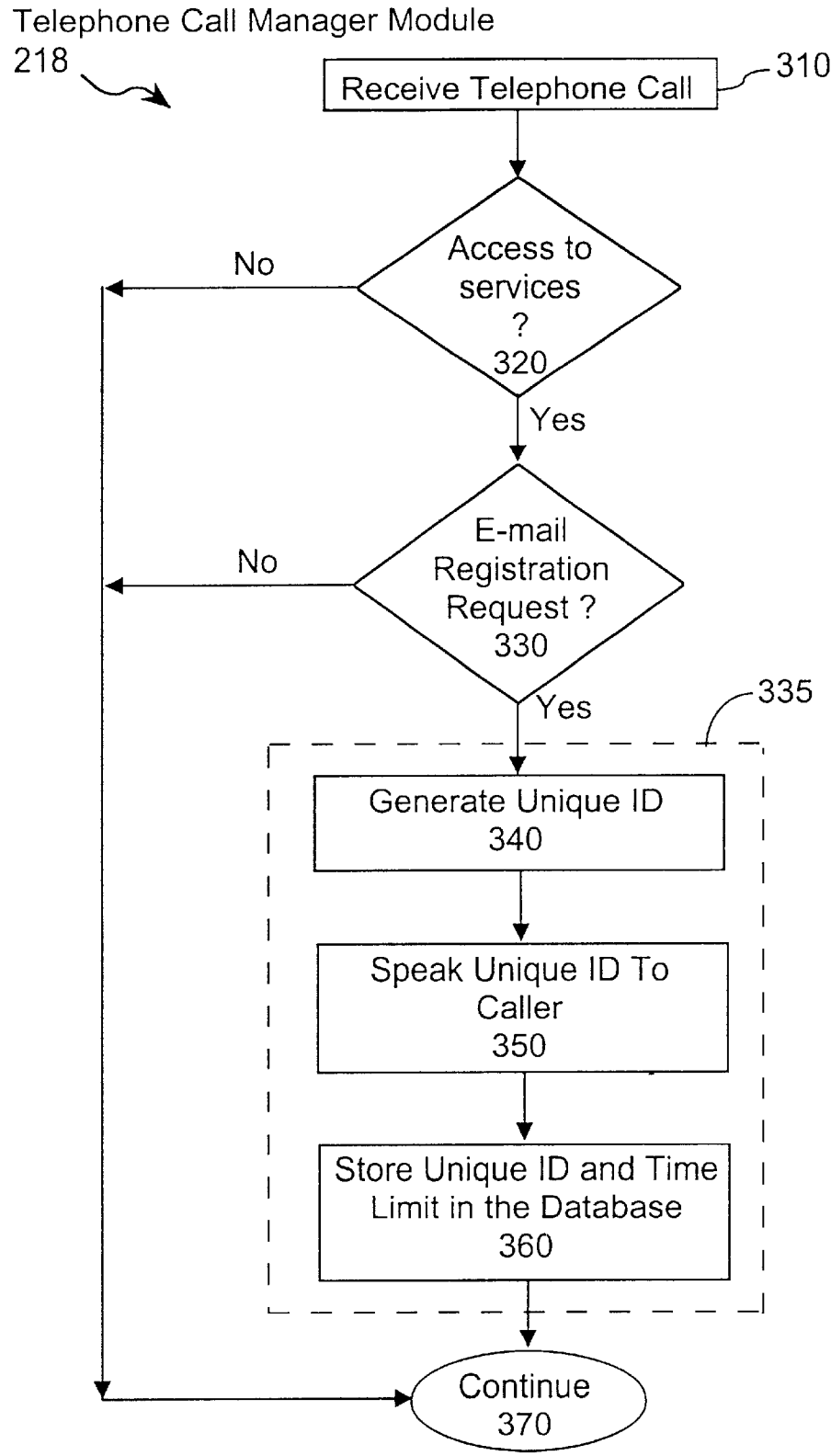
FIG. 3 is a flow diagram of an embodiment of a telephone call manager module for managing an E-mail registration request at a service provider.

Referring to FIG. 3, there is shown a high-level flow diagram of an exemplary embodiment of a process of the Telephone Call Manager Module 218. The Telephone Call manager Module 218 receives a telephone call 310, and the identity of the caller is verified 320 to ensure that the caller has legitimate access to the module's 218 services. When access to the module's 218 services is denied 320, the process may perform other steps 370 (e.g., logging information concerning the unsuccessful access attempt) before exiting. Otherwise, a set of options is preferably presented to the caller, the set of options including an option to register an E-mail address. These options may be presented to the caller in a variety of forms. For example, the options may be presented to the caller in the form of voice directions, possibly including a predefined hierarchical menu for the caller to navigate to register an E-mail address. The user may select options either by pressing keys on the telephone keypad, or by speaking an appropriate command or response if the Telephone Call Manager Module 218 includes a speech recognition driven interface. In the latter case, the system might ask an open question such as "What do you want to do?" The subscriber, in response, might say, "Register an e-mail address."

When the caller does not select an option corresponding to E-mail address registration 330, other processing, e.g., processing corresponding to a different selected option, may be performed 370. When the caller does select an option corresponding to E-mail address registration 330, the E-mail Services Module 335 performs a number of steps to register the E-mail address. First, the E-mail Services Module 335 generates a unique ID 340 corresponding to the specific E-mail registration request. Next, E-mail Services Module 335 speaks the unique ID to the caller 350. Preferably, the unique ID is spoken twice, and the caller is given the option of having it repeated additional times. The E-mail Services Module 335 stores the unique ID and the time that the telephone call was received 360 (or "timestamp"). The unique ID and the timestamp are stored in a database. Other processing may be performed 370 before the Telephone Call Manager 218 is finished.

In a preferred embodiment, the unique ID is stored to verify subsequent E-mail address registration requests directed to the Enhanced Service Platform (discussed in detail below). The stored timestamp can be used to facilitate administrative tasks. For instance, the time stamp can be used to flag any E-mail address registration requests that remain "un-verified," after a predetermined amount of time. The flagged entries can be logged or removed from an E-mail address registration request queue.

The E-mail Manager Module

Figure 4A:
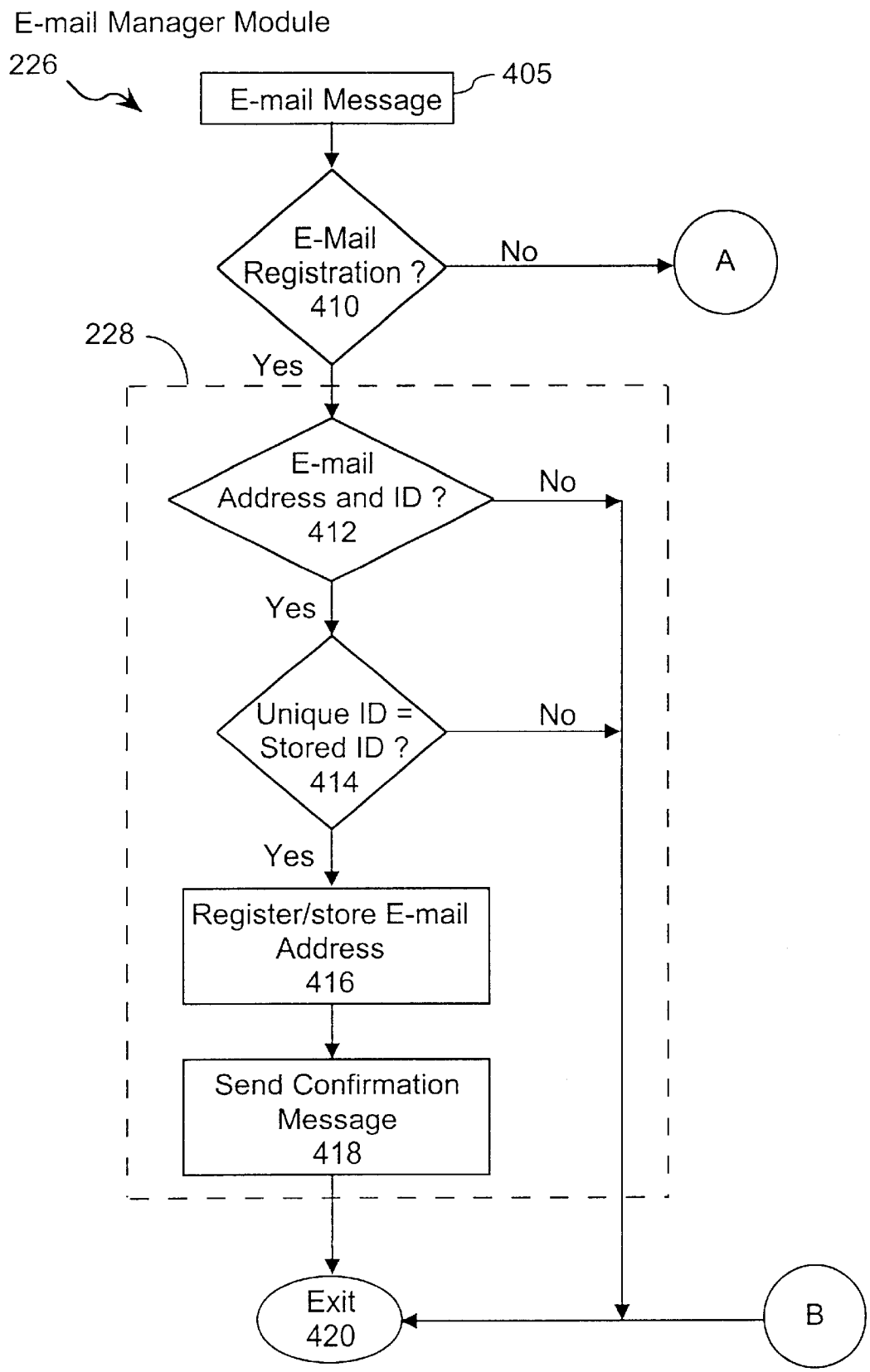
FIGS. 4A and 4B depict a flow diagram of an embodiment of a E-mail address registration module for managing an E-mail registration request at a service provider.
Figure 4B:
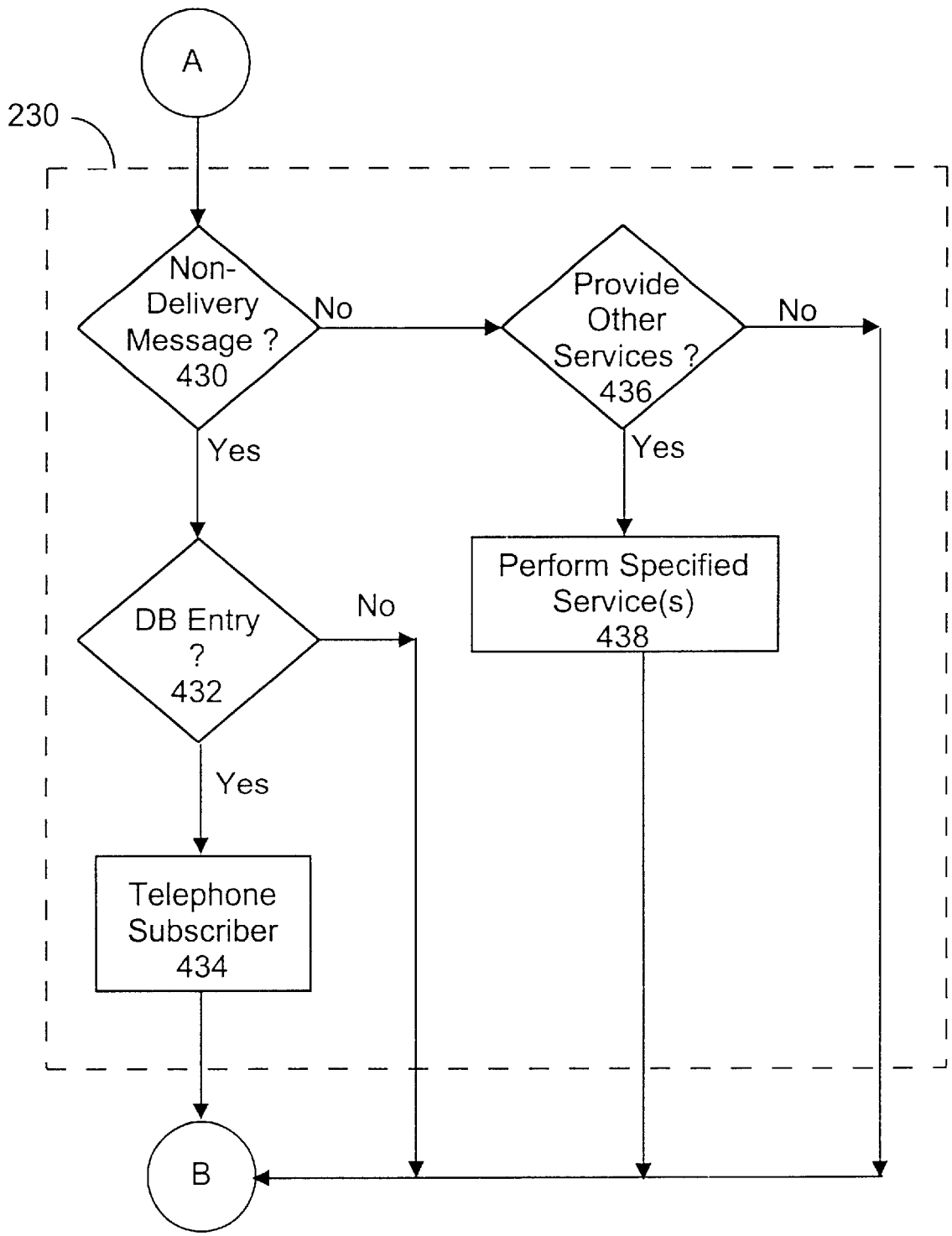

Referring to FIGS. 4A and 4B, there are shown high-level flow diagrams of an exemplary process of the E-mail Manager Module 226. The E-mail Manager Module 226 receives an E-mail message 405. When the E-mail message 405 is associated with an E-mail address registration request 410 from a legitimate subscriber to an Enhanced Service Platform's services, a Registration Module 228 registers the E-mail address. When the E-mail message 405 is not an E-mail address registration request 410, an E-mail Services Module 230 determines if the E-mail message 405 requires further processing, such as storing the E-mail message for a subscriber, or forwarding the E-mail message to a predetermined location.

The Registration Module

When the E-mail message 405 is associated with an E-mail address registration request 410 from a legitimate subscriber to an Enhanced Service Platform's services, a Registration Module 228 performs a set of steps to register the E-mail address. The Registration Module 228 determines if the E-mail message 405 contains required information for E-mail address registration 412. Required information includes an E-mail address to register with the Enhanced Service Provider, and an ID. The ID is preferably a unique ID given to the subscriber by the Telephone Call Manager Module (described in detail above). The E-mail address may be indicated in the E-mail message 405 in a variety of ways. For example, the E-mail address may be encoded in the ID included in the E-mail message 405, the E-mail address may be included in the body of the E-mail message 405, or the E-mail address may be included in the network routing information included in the E-mail message 405.

When an E-mail message 405 contains the required information 412, the Registration Module 228 queries a database 414 for a registration request record corresponding to the ID contained in the E-mail message 405. Each registration request record has a stored copy of a unique ID given to a subscriber by the Telephone Call Manager Module for a particular E-mail registration request. When a registration request record is located 414 containing a stored copy of a unique ID that corresponds to the ID contained in the E-mail message 405, the specified E-mail address is registered 416 with the Enhanced Service Provider. In some embodiments the specified E-mail address is validated before it is registered. For instance, the E-mail address may be tested to see that it meets basic E-mail address formatting requirements, and it may be compared against a "black list" of E-mail addresses that the system is programmed to not accept.

Typically registration is accomplished by storing the E-mail address in the subscriber's profile, or any similar data structure used by the Enhanced Service Provider. After the step of registration 416, a confirmation E-mail message is sent to the registered E-mail address 418 and the process exits 420.

The Service Module

When an E-mail message 405 is not an E-mail address registration request 410, an E-mail Services Module 230 determines if the E-mail message 405 requires further processing, such as storing the E-mail message for a subscriber, or forwarding the E-mail message to a predetermined location.

A non-delivery notification message is typically received in response to sending an E-mail message to an invalid or inoperative E-mail address. When the E-mail Manager Module 226 receives a non-delivery notification, it is possible that the message was received in response to the E-mail Manager Module 226 sending a confirmation E-mail message (at step 418) to a subscriber at an invalid e-mail address.

When a non-delivery notification E-mail message 405 is received by the E-mail Manager Module 226 (430), a database is searched 432 for a record corresponding to the E-mail address to which delivery failed. When a corresponding record is identified, the Service Module 230 leaves a voice message in the subscriber's voice mail box that indicates that the E-mail address registered by the subscriber may be invalid or inoperative. Alternately, the Service Module 230 may telephone the subscriber 434 (identified by the record) to provide an appropriate notification (i.e., voice message) that the E-mail address registered by the subscriber may be invalid or inoperative. Then the process ends 420.

When the E-mail message 405 is not an E-mail registration request, and not a non-delivery notification, the Services Module 230 determines if any other processing is required 436. For example, a subscriber may have specified that incoming E-mail messages (sent to the registered E-mail address) are to be processed as follows: stored in a predetermined mailbox, or forwarded to another E-mail address. When further processing is required, it is performed 438, and then the process ends 420.

This exemplary process of the E-mail Manager Module 226 is not meant to be limiting in any way. This process is shown solely for purposes of explanation. Using teachings provided in this disclosure, persons skilled in the art of computer programming could implement the E-mail Manager Module 226 to provide the disclosed process in a variety of ways. For example, step 412, for determining if the E-mail message 405 contains the proper information required for E-mail address registration, could be performed outside of the Registration Module 228. Similarly, the E-mail Manager module could record the status of E-mail address registration attempts.

The Database Record

Referring to FIG. 5, there is shown an embodiment of a database record 450. The database record 450 is used to store subscriber information, including, for example, the following data fields: a telephone number 452, an E-mail address 454, a unique ID 456, and a time stamp 458. In other embodiments, the database record 450 may include a variety of other subscriber related information, for example: an E-mail address indicating where incoming E-mail is to be forwarded, a pager telephone number, a fax number, and a forwarding telephone number.

E-Mail Registration Update

Figure 4C:
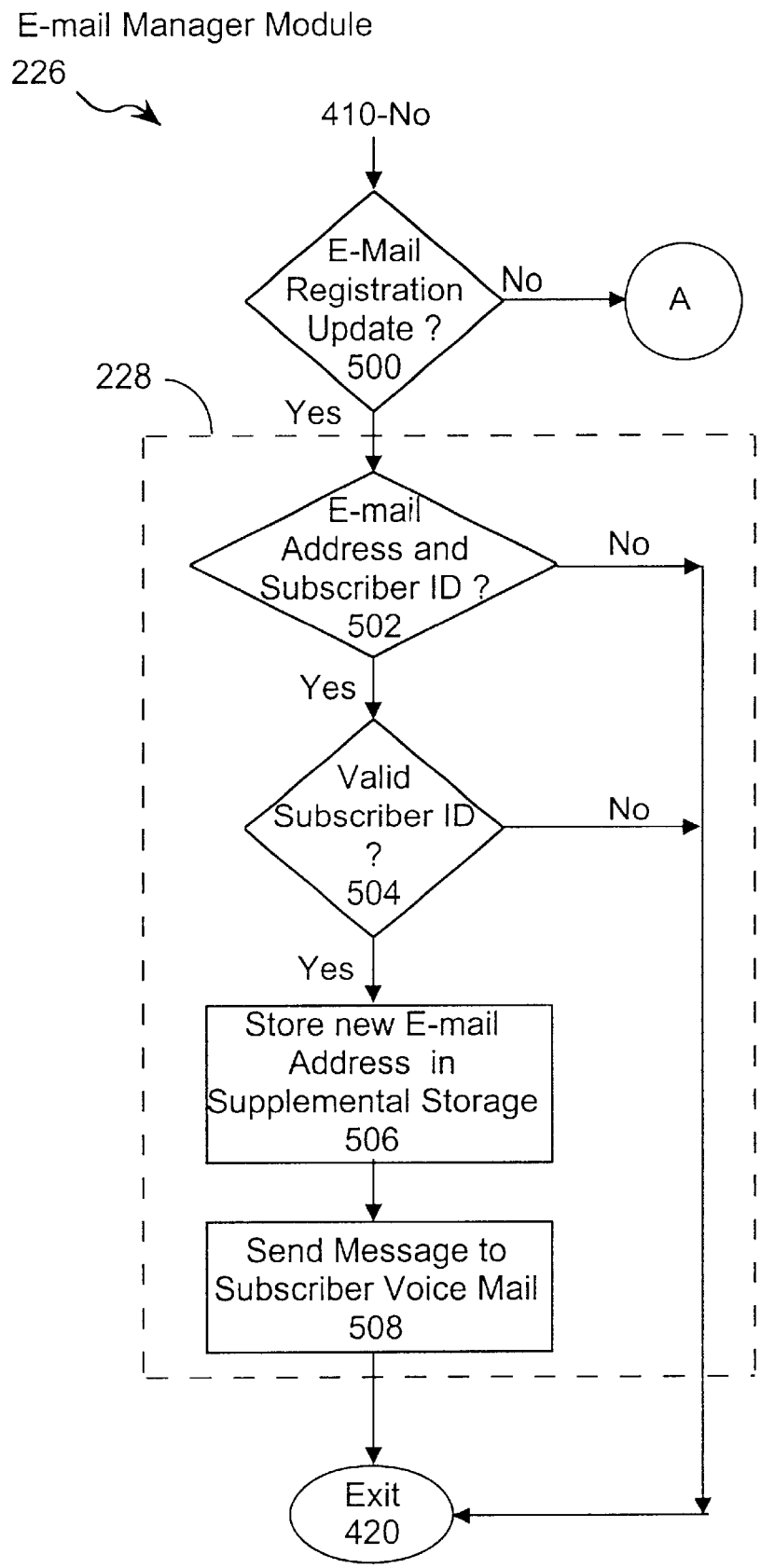
FIGS. 4C and 4D depict flow diagrams of procedures executed by an e-mail manager module and telephone call manager module, respectively, for updating a subscriber's registered E-mail address.

In a preferred embodiment, once a user has registered a first E-mail address, a different, simpler procedure can be used for replacing the registered E-mail address with a second E-mail address. Referring to FIG. 4C, when an E-mail message received by the E-mail manager module is an E-mail registration update message (500-Y), the message is checked to see that it contains or otherwise specifies the subscriber whose E-mail address is being updated, and an E-mail address (502). If not (502-No), the registration update message is rejected (420). If the subscriber ID specified by the message is invalid (504), the message is rejected (420). If the subscriber ID is valid (504) and the specified E-mail address passes any syntax or other verifications at step 502, the new e-mail address is stored. The new e-mail address is preferably stored in a supplemental storage area, such as a table for pending E-mail address updates, but could alternately be stored in an extra field of the subscriber record (506). Then an "E-mail update validation" message is left in the voice mail box for the subscriber specified by the update message (508). This message asks the subscriber to validate the E-mail address update as being authorized by the subscriber.

Figure 4D:
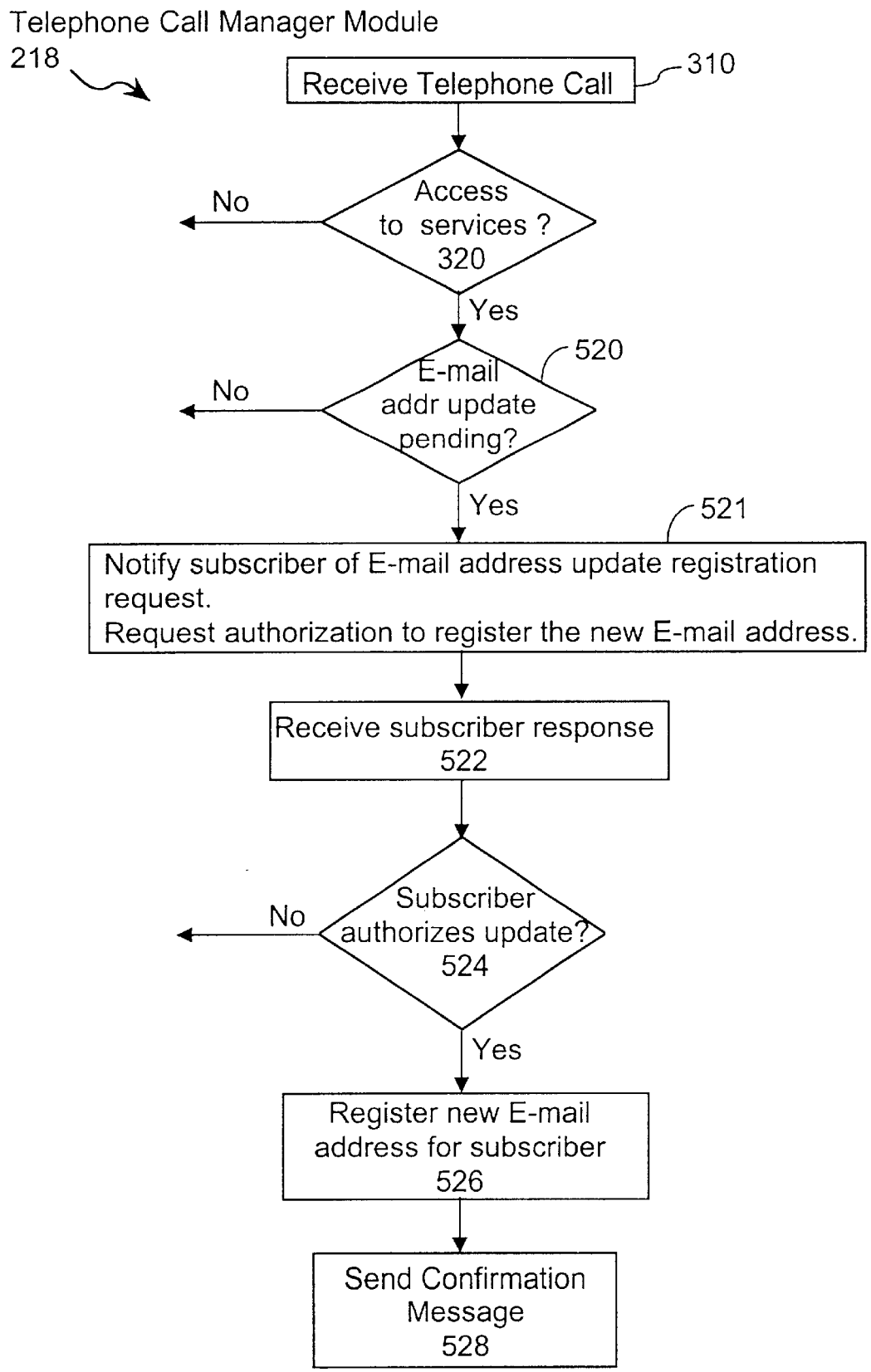

Referring to FIG. 4D, when the telephone call manager module receives a telephone call from a subscriber, if the subscriber requests access to subscriber services (320-Yes) and there is a pending E-mail address update for the subscriber (520-Yes), the subscriber is automatically notified of the new E-mail address update registration request, and the system requests authorization from the subscriber to register the E-mail address (521). The subscriber inputs a response, either verbally or by keypad and that response is received by the telephone call manager module (522). If the subscriber authorizes the update (524-Yes), the new E-mail address is registered (526). Registration may be accomplished by storing it in the appropriate field of the subscriber's profile. A confirmation message is sent by E-mail to the newly registered E-mail address (528).

The above described method for updating a subscriber's E-mail registration could also be used for registering an initial E-mail registration. In this method, the role of the unique identifier in the registration method first described above is implicitly replaced by the subscriber's entering his/her password to gain access to the telephone call manager module.

Alternate Embodiments

The present invention can be implemented as a computer program product that includes a computer program mechanism embedded in a computer readable storage medium. For instance, the computer program product could contain the program modules shown in FIG. 2. These program modules may be stored on a CD-ROM, magnetic disk storage product, or any other computer readable data or program storage product. The software modules in the computer program product may also be distributed electronically, via the Internet or otherwise, by transmission of a computer data signal (in which the software modules are embedded) on a carrier wave.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A system for registering E-mail addresses for subscribers having access to a service platform comprising:
a telephone call manager configured to receive telephone calls at the service platform and to process E-mail address registration requests by subscribers, the telephone call manager upon receiving a telephone call, and during the telephone call receiving a first E-mail registration request from one of the subscribers, providing the subscriber with a unique identifier and storing a copy of the unique identifier; wherein the first E-mail registration request solicits issuance of the unique identifier to enable the subscriber to subsequently register a particular E-mail address not identified in the first E-mail registration request; and
an E-mail manager configured to receive and process an E-mail message sent to a first E-mail address, the received Email message including a second E-mail registration request to register a second E-mail address, the received E-mail message including the unique identifier; the E-mail manager, upon receipt of the E-mail message, comparing the unique identifier with the copy of the unique identifier stored by the telephone call manager, and registering the second E-mail address only if the unique identifier and the copy of the unique identifier correspond.

2. The system of claim 1, wherein the E-mail manager is further configured to send a confirmation E-mail message to the second E-mail address when the second E-mail address is registered.

3. The system of claim 2, wherein
the telephone call manager is further configured to:
set a time-limit for receiving the E-mail message requesting registration of the second E-mail address, the time-limit corresponding to the time that the telephone call was received; and
store in a database, in conjunction with the unique identifier, the time-limit, and a telephone number corresponding to the subscriber; and
the E-mail manager is configured to reject the second E-mail registration request if the E-mail message requesting registration of the second E-mail address is not received within the time-limit.

4. The system of claim 3, wherein when the E-mail manager receives a non-delivery notification indicating that the confirmation E-mail message invalid or inoperative E-mail address, the telephone call manager is configured to use the telephone number to deliver to the subscriber a corresponding voice message.

5. The system of claim 1, wherein the second E-mail address is specified by the unique identifier.

6. A method for registering an E-mail address for a subscriber having access to a service platform, the method comprising steps of:
receiving a telephone call at the service platform from the subscriber, and during the telephone call, receiving a first E-mail address registration request;
providing the subscriber with a unique identifier and a first E-mail address associated with the service platform; wherein the first E-mail registration request solicits issuance of the unique identifier to enable the subscriber to subsequently register a particular E-mail address not identified in the first E-mail registration request;
storing a copy of the unique identifier;
receiving an E-mail message addressed to the first E-mail address, the E-mail message including a second E-mail registration request to register a second E-mail address, the E-mail message including the unique identifier;
comparing the stored copy of the unique identifier with the unique identifier; and
registering the second E-mail address only if the stored copy of the unique identifier corresponds to the unique identifier.

7. The method of claim 6, wherein when the second E-mail address is registered, the method further comprises steps of:

sending a confirmation E-mail message to the second E-mail address; and in the event that a non-delivery notification is received by the service platform in response to the step of sending, telephoning the subscriber with a corresponding voice message.

8. The method of claim 6, wherein the method further comprises steps of:

setting a time-limit for receiving the E-mail message, the time-limit corresponding to the time that the telephone call was received;

storing in a database, in conjunction with the unique identifier, the time-limit, and a telephone number corresponding to the subscriber; and rejecting the second E-mail registration request if the E-mail message is not received within the time-limit.

9. The method of claim 6, where the second E-mail address is specified by the unique identifier.

10. A computer program product for use in conjunction with a computer controlled service platform, the computer program product comprising a computer readable storage medium and a computer program mechanism embedded therein, the computer program mechanism comprising:

a telephone call manager configured to receive telephone calls at the service platform and to process E-mail address registration requests by subscribers, the telephone call manager upon receiving a telephone call, and during the telephone call receiving a first E-mail registration request from one of the subscribers, providing the subscriber with a unique identifier and storing a copy of the unique identifier; and an E-mail manager configured to receive and process an E-mail message sent to a first E-mail address, the received Email message including a second E-mail registration request to register a second E-mail address, the received E-mail message including the unique identifier; the E-mail manager, upon receipt of the E-mail message, comparing the unique identifier with the copy of the unique identifier stored by the telephone call manager, and registering the second E-mail address only if the unique identifier and the copy of the unique identifier correspond.

11. The computer program product of claim 10, wherein the E-mail manager is further configured to send a confirmation E-mail message to the second E-mail address when the second E-mail address is registered.

12. The computer program product of claim 11, wherein the telephone call manager is further configured to:

set a time-limit for receiving the E-mail message requesting registration of the second E-mail address, the time-limit corresponding to the time that the telephone call was received;

store in a database, in conjunction with the unique identifier, the time-limit, and a telephone number corresponding to the subscriber; and the E-mail manager is configured to reject the second E-mail registration request if the E-mail message requesting registration of the second E-mail address is not received within the time-limit.

13. The computer program product of claim 12, wherein when the E-mail manager receives a non-delivery notification indicating that the confirmation E-mail message was sent to an invalid or inoperative E-mail address, the telephone call manager is configured to use the telephone number to deliver to the subscriber a corresponding voice message.

14. The computer program product of claim 10, wherein the second E-mail address is specified by the unique identifier.

15. A system for registering E-mail addresses for subscribers having access to a service platform comprising:

an E-mail manager configured to receive and process an E-mail message sent to a first E-mail address, the received E-mail message including an E-mail registration request to register a second E-mail address specified by the message, the received E-mail message including a subscriber identifier specifying a subscriber of the service platform; the E-mail manager, upon receipt of the E-mail message, storing an indication of a pending E-mail registration request for the specified subscriber; and a telephone call manager configured to receive telephone calls at the service platform, to validate a password provided by a subscriber of the service platform during the course of a telephone call to the service platform so as to confirm the subscriber's authority, to determine when processing a call from a subscriber of the service platform, wherein the subscriber's password has been validated during the processing of the call, whether there is a pending E-mail registration request for the subscriber, to request authorization from the subscriber to register the second E-mail address specified by the previously received E-mail registration request, and to register the second E-mail address as the subscriber's E-mail address upon receipt of such authorization.

16. The system of claim 15, wherein the system is further configured to send a confirmation E-mail message to the second E-mail address when the second E-mail address is registered.

\* \* \* \* \*